United States Patent
Akehi et al.

(10) Patent No.: US 6,698,177 B1
(45) Date of Patent: Mar. 2, 2004

(54) CAM MECHANISM FOR TRANSLATION OF CIRCULAR MOTION INTO RECIPROCAL MOTION

(75) Inventors: Youso Akehi, Hiroshima (JP); Fumio Nomura, Hiroshima (JP)

(73) Assignees: Delta Kogyo Co, LTD, Hiroshima (JP); Shin-Daiwa Kogyo Co., LTD, Hiroshima (JP)

(*) Notice: Subject to any disclaimer, the term of this patent is extended or adjusted under 35 U.S.C. 154(b) by 0 days.

(21) Appl. No.: 09/492,814

(22) Filed: Jan. 28, 2000

(65) Prior Publication Data (65)

(30) Foreign Application Priority Data

Jan. 28, 1999 (JP) .............................. 11-020505

(51) Int. Cl.⁷ ............................................... A01D 34/13
(52) U.S. Cl. .............................. 56/236; 74/567; 74/570; 74/440
(58) Field of Search ..................... 56/233, 236, 13.6, 56/17.6, 246; 74/568 R, 594.3, 89.16, 594.2, 567, 569, 570, 89, 50, 440, 25, 89.42, 409, 421 R; 123/90.17, 90.31; 464/2; 30/220, 216, 218

(56) References Cited

U.S. PATENT DOCUMENTS

| 1,701,227 A |   | 2/1929  | Dawson                    |
|-------------|---|---------|---------------------------|
| 1,980,865 A | * | 11/1934 | Kauffman ............ 30/216 |
| 2,092,888 A | * | 9/1937  | MacCoul ............. 74/440 |
| 2,206,831 A | * | 7/1940  | Berthelsen ........... 74/440 |
| 2,787,111 A | * | 4/1957  | Templeton ........... 56/297 |
| 3,331,331 A | * | 7/1967  | Irgens et al. ........ 417/559 |
| 3,897,630 A | * | 8/1975  | Glover et al. ....... 30/220 |
| 3,916,359 A | * | 10/1975 | Goto et al. .......... 334/87 |
| 3,962,924 A | * | 6/1976  | Glover et al. ....... 74/50 |
| 3,973,378 A | * | 8/1976  | Bartasevich et al. .... 56/11.9 |
| 4,280,276 A | * | 7/1981  | Comer et al. ........ 30/144 |
| 4,442,516 A | * | 4/1984  | Funabashi ............ 369/43 |
| 5,083,376 A | * | 1/1992  | Lentino ................ 30/392 |
| 5,119,686 A | * | 6/1992  | Stillabower ........... 74/37 |
| 5,155,914 A | * | 10/1992 | Ohkanda .............. 30/369 |
| RE35,258 E  | * | 6/1996  | Palm .................... 30/392 |
| 5,531,027 A | * | 7/1996  | Martinez et al. ...... 30/216 |
| 5,555,776 A | * | 9/1996  | Gazza ................... 74/567 |
| 5,581,891 A | * | 12/1996 | Wheeler et al. ...... 30/216 |
| 5,689,887 A | * | 11/1997 | Heywood et al. ..... 30/220 |
| 5,823,152 A | * | 10/1998 | Ushida ............. 123/90.17 |
| 5,865,386 A | * | 2/1999  | Tao ..................... 242/246 |
| 5,924,334 A | * | 7/1999  | Hara et al. .......... 74/568 R |
| 6,263,579 B1 | * | 7/2001 | Nagashima ............ 30/220 |

FOREIGN PATENT DOCUMENTS

| JP | 56106512   |   | 8/1981  |                  |
|----|------------|---|---------|------------------|
| JP | 57-63521   | * | 4/1983  | ...... G03B/19/00 |
| JP | 58135514   | * | 2/1985  | ...... G11B/15/093 |
| JP | 60137214   |   | 7/1985  |                  |
| JP | 6441249    |   | 3/1989  |                  |
| JP | 11-243779  | * | 9/1997  |                  |
| JP | 9-19577    | * | 2/1998  | ...... B26B/19/28 |
| JP | 11-266702  | * | 3/1998  | ...... A01G/3/04 |
| JP | 10-115203  | * | 5/1998  | ...... F01L/1/34 |

\* cited by examiner

*Primary Examiner*—Árpád Fab Kovács
(74) *Attorney, Agent, or Firm*—Liniak, Berenato & White

(57) ABSTRACT

A cam mechanism for use in a mowing machine. The cam mechanism is comprised of a spur gear and protruding eccentric cams from the top and bottom surfaces of the spur gear. The cam mechanism is formed from a half blanking press process. The eccentric cams are symmetrically formed around a shaft hole located in the center of the spur gear. Members with a hole equaling that of the eccentric cam and shaft hole point symmetry are then fitted onto the eccentric cam. The members are then capable of reciprocation with a phase differential of 180 degrees of each other. The concave portion of the eccentric cam permits lubricants to be filled in the space facilitating the smooth operation of the cam mechanism.

5 Claims, 9 Drawing Sheets

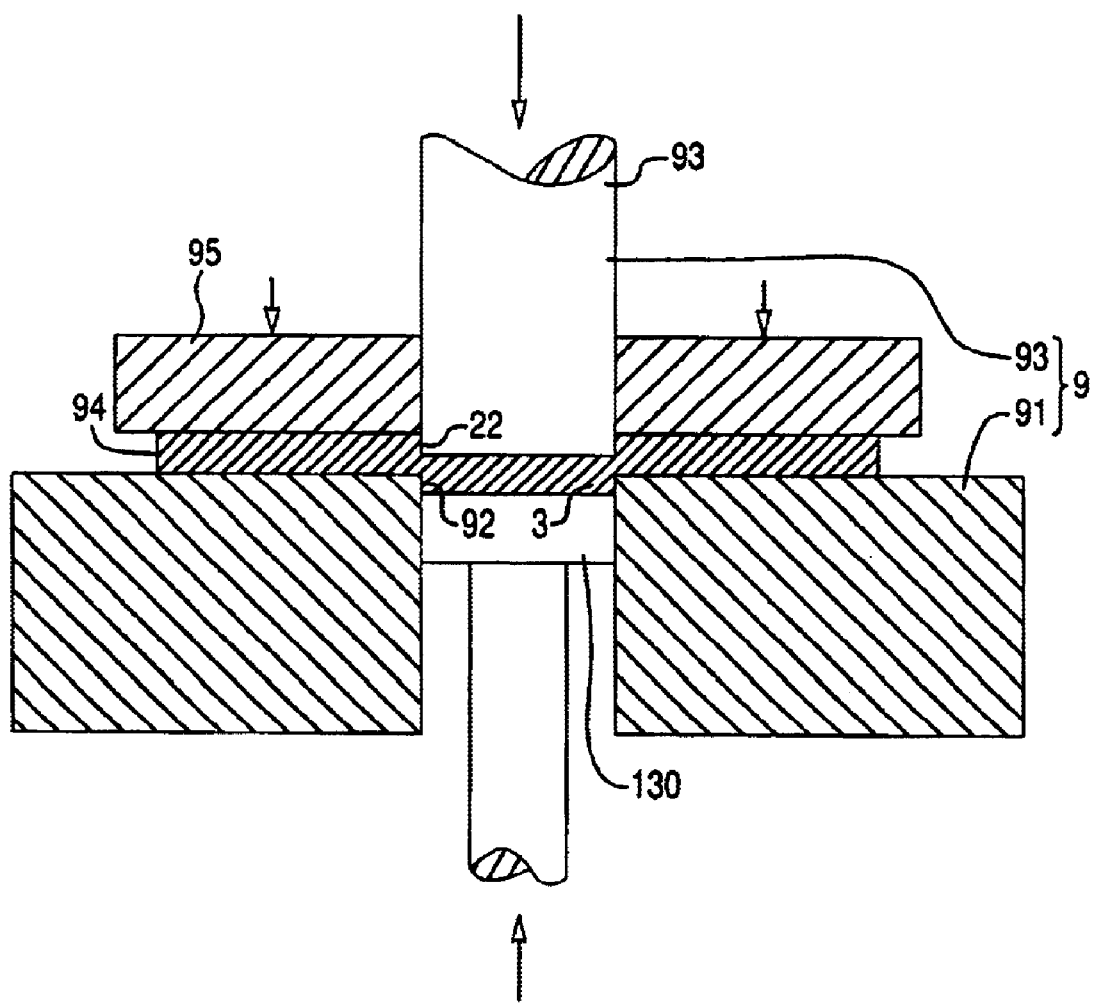

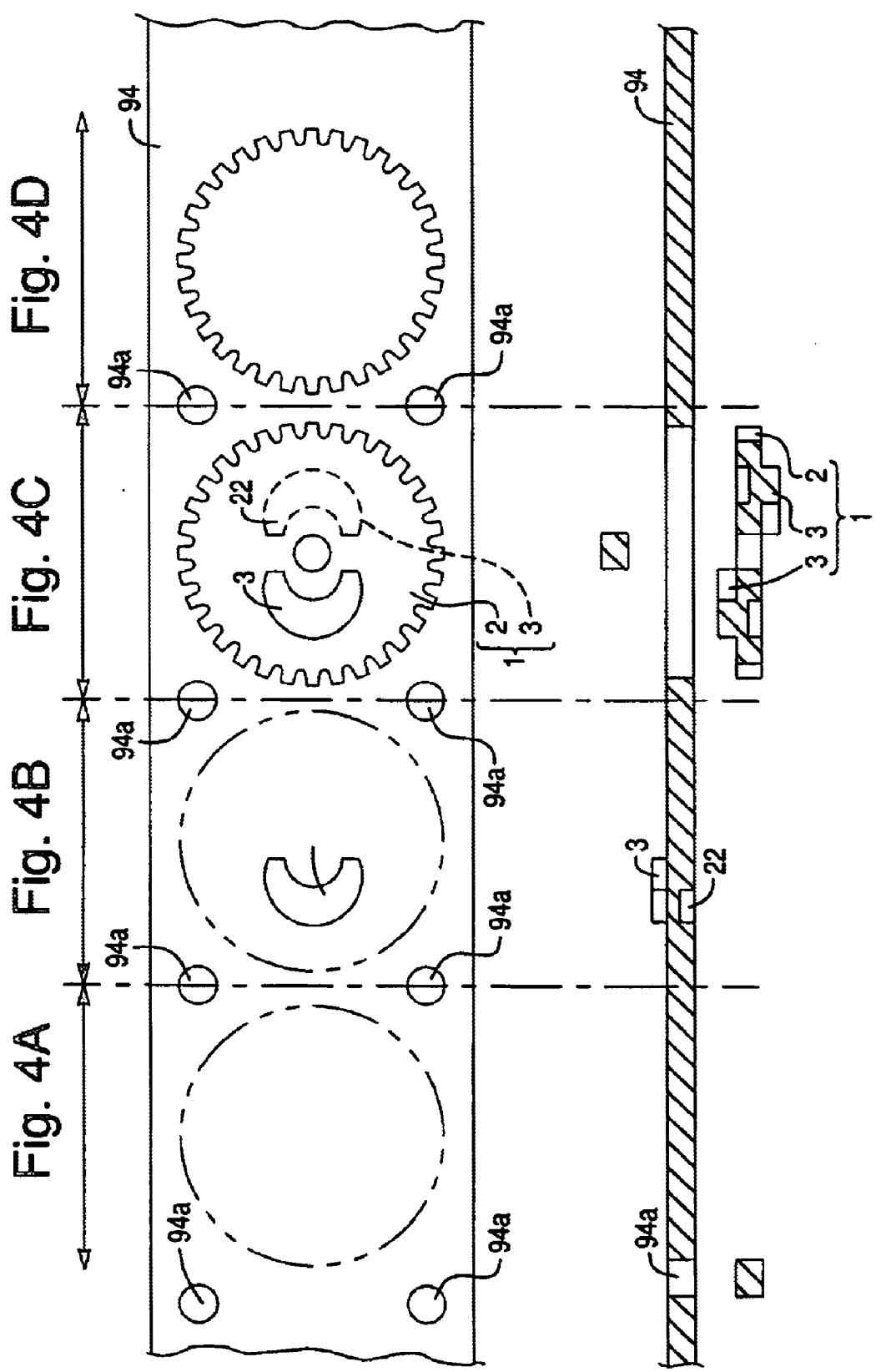

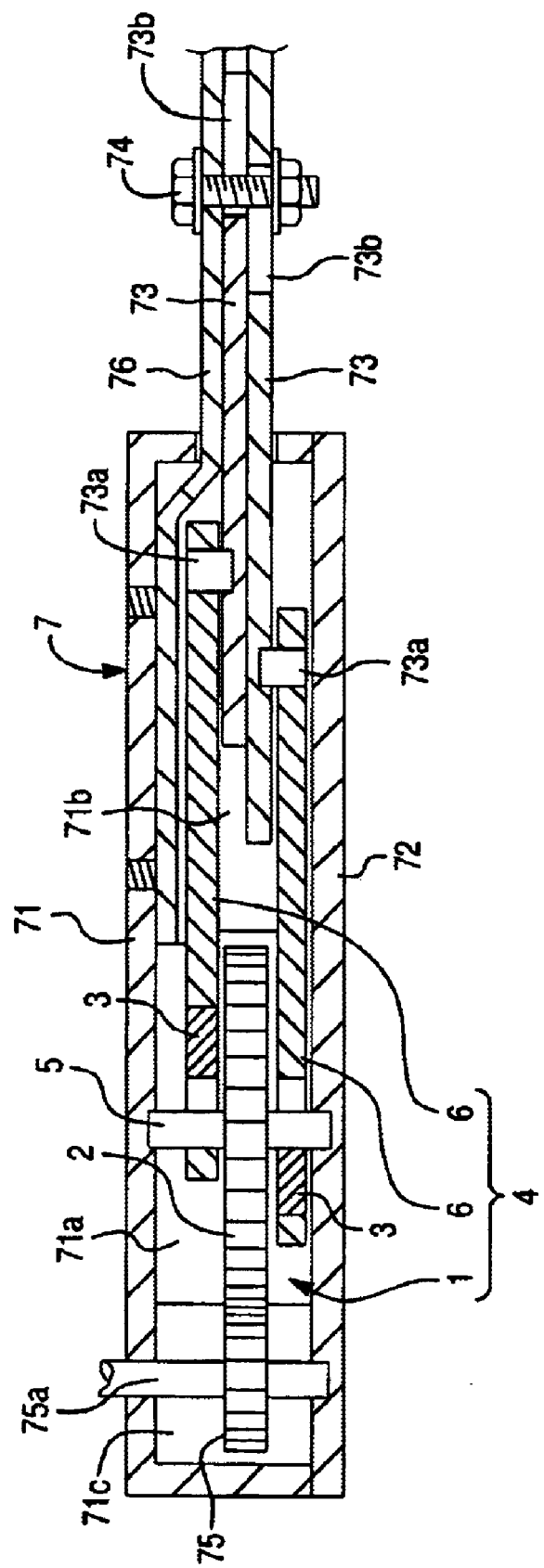

CAM MECHANISM FOR TRANSLATION OF CIRCULAR MOTION INTO RECIPROCAL MOTION

BACKGROUND OF THE INVENTION

1. Field of the Invention

The present invention relates to a cam mechanism in which a cam is protruded from the surface and/or back of a gear, a cam apparatus utilizing the cam mechanism, and a mowing machine utilizing the cam apparatus.

2. Description of Related Art

Conventionally, a cam mechanism for converting the circular motion to the reciprocating motion is shown in FIG. 1A and FIG. 1B is known. The cam mechanism 100, as shown in FIG. 1A, comprises a gear 110 and a circular cam 120 fixed on the eccentric position of the gear 110. The gear 110 has a central hole 111 formed at the central position, and the circular cam 120 has an eccentric hole 121 having the same diameter as the diameter of the central hole 111 at the eccentric position. The circular cam 120 piles on the gear 110 and they are fixed together so that the center of the hole 111 is aligned to the center of the hole 121.

The circular cam 120 has two through holes 122 in the appropriate positions, and the gear 110 has screw holes 112 corresponding to the through holes 122. Then, as shown in FIG. 1B, the circular cam 120 is fixed to the gear 110 by inserting and screwing screws into the through holes 122 and the screw holes 112. It should be noted that the circular cam 120 may be fixed to the gear 110 by inserting and screwing caulking nails into the through holes 122 and the screw holes 112 instead of using the screws.

The gear 110 is supported by a supporting shaft 140 after the supporting shaft 140 is slidably inserted into the central hole 111 of the gear 110 and the eccentric hole 121 of the circular cam 120. The gear 110 engages with a driving gear 150, so that the gear 110 rotates around the supporting shaft 140 by the rotation of the driving gear 150 around a driving shaft 151.

As shown in FIG. 1B, there is a connecting rod 160 having a connecting hole 161 slidably fitted on the circular cam 120 of the cam mechanism 100. Accordingly, as the gear 110 rotates around the supporting shaft 140, the rotation is transmitted to the connecting rod 160 through the circular cam 120 eccentric-rotating around the supporting shaft 140, so that the connecting rod 160 reciprocates in the direction shown by the arrows in FIG. 1B.

The above-described cam mechanism 100 is utilized in the various kinds of apparatus which require the conversion of the circular motion into the reciprocating motion. For example, there are mowing machines for gardening disclosed in Japanese Patent Laid-open No. 64-41249, Japanese Patent Laid-open No. 60-137214 and Japanese Patent Laid-open No. 56-106512.

BRIEF SUMMARY OF THE INVENTION

In the conventional cam mechanism 100 shown in FIGS. 1A, 1B, in order to make a circular cam 120 on the gear 110, first the circular cam 120 has to be manufactured individually, which makes the material cost and the manufacturing cost higher.

Further, the circular cam 120 is fixed on the gear 110 under the complicated steps in which the screw holes 112 are formed in the gear 110 and in which the through holes 122 are formed in the circular cam 120 corresponding to the screw holes 122 and in which screws 130 are inserted and screwed into the through holes 122 and the screw holes 112. This makes the assembling cost higher.

Therefore, it is an object of the present invention to provide a cam mechanism which can lower the manufacturing cost and the assembling cost, and a mowing machine utilizing the cam mechanism.

A cam mechanism of the present invention comprises a metal gear, and an eccentric cam protruded from the eccentric position of at least one of the surface and the back of the gear. The eccentric cam is formed by performing half blanking press processing on the gear from the other side of the eccentric cam to be formed.

The half blanking press processing is one of fine blanking.

The structure of the mold is either a zero clearance method in which no clearance exists between a blanking hole of a lower mold and a punch for blanking or a negative clearance method in which the cross section of the punch for blanking is slightly larger than the cross section of the blanking hole. The mold comprises a presser having a projection for pressing the material to be processed and an inverse presser for pressing the material from underneath. The material to be processed is pressed up to the half of the thickness while it is tightly held.

According to thus formed cam mechanism, the eccentric cam has an extremely smooth cut surface, no shear drop, no burr and the good dimensional accuracy. Therefore, the eccentric cam functions sufficiently when the circumferential surface slides to other member. Especially, with the employment of the negative clearance method, the dimensional accuracy of the eccentric cam is improved.

Further, the material cost and the processing cost are made lower as compared to the case that the eccentric cam is fixed to the gear with the screws or caulking, which mean that the manufacturing cost is lowered.

In the cam mechanism, the eccentric cam may be formed at the surface and back of the gear. Accordingly, the spur gear can convert the circular motion to the reciprocating motion at both surfaces.

Further, the gear may have a shaft hole at the central position, and the eccentric cams can be formed in point symmetry with respect to the axis of the shaft hole. Accordingly, a pair of other members can reciprocate in phase difference of 180 degrees.

Furthermore, the eccentric cam may comprise an inscribed surface inscribed in a circular locus having a center and a diameter so as to include the shaft hole, and a concave notch formed by separating an opposing surface which is the opposite side of the inscribed surface from the shaft hole by a predetermined distance.

Accordingly, when other member having a circular hole is fitted on the eccentric cam, the shaft inserted in the shaft hole of the gear is inserted in the circular hole, and a space is formed between the shaft and the concave portion of the eccentric cam. Therefore, the lubricant can be filled in the space, so that the eccentric cam can operate smoothly.

Further, in the case of the eccentric cams formed on the surface and back of the gear in point symmetry, although each circular locus interferes the other, the interference of the eccentric cams of the gear can be avoided because of the concave notch.

Furthermore, in the cam mechanism, a central shaft is inserted into the shaft hole, and a sliding ring is fitted on the central shaft, and the sliding ring has an outer diameter so as to slide on the inner surface of the shaft hole.

According to this cam mechanism, since the inner surface of other member is in contact with the outer surface of the central shaft over the sliding ring when other member having a circular hole is fitted on the eccentric cam, the gear rotates around the central shaft, which makes the crank motion of other member smoother.

Further, the eccentric cam may be formed by a plurality of cam protrusions inscribed in a circular locus having a center and a diameter so as to include the shaft hole. With the employment of the cam protrusions as the eccentric cam, total cross section of the plurality of protrusions is smaller than the cross section of the eccentric cam. Therefore, the press pressure of the half blanking press processing can be made smaller, which lowers the energy cost.

A cam apparatus of the present invention comprises one of the above-described cam mechanism of the present invention, and an output rod having a sliding hole at one end to fit slidably on the eccentric cam. The gear is connected to the output rod by fitting the sliding hole on the eccentric cam.

According to the cam apparatus, the rotation of the gear is converted into the reciprocating motion through the eccentric cam and the output rod.

A mowing machine of the present invention comprises one of the above-described cam mechanism of the present invention, and an output rod having a sliding hole at one end to fit slidably on the eccentric cam, to be connected to the output rod when the sliding hole is fitted on the eccentric cam, and a pair of blade members having a plurality of mowing blades. The mowing blades are piled up so as to be slidable in the lengthwise direction, and at least one of the pair of the blade members is connected to the other end of the output rod.

According to the mowing machine, the rotation of the gear is converted into the reciprocating motion through the eccentric cam and the output rod and transmitted to the pair of blade members. Then, the mowing blades reciprocate in the lengthwise direction to cut greens.

BRIEF DESCRIPTION OF THE DRAWINGS

FIG. 2A is a perspective view thereof. FIG. 2B is a plan view thereof. FIG. 2C is a sectional view of FIG. 2B taken along the lines A.

FIG. 3 is a sectional view for explaining the half blanking press processing.

FIGS. 4A, 4B, 4C, 4D are views showing a method of manufacturing the cam mechanism by the half blanking press processing. FIG. 4A shows a piercing process. FIG. 4B shows a process of half blanking of back. FIG. 4C shows a process of half blanking of surface. FIG. 4D shows the raw iron plate with the spur gear removed after the half blanking processed.

FIG. 5A is a perspective view thereof. FIG. 5B is a plan view thereof. FIG. 5C is a sectional view of FIG. 5B taken along the lines B.

FIG. 6A is a perspective view thereof. FIG. 6B is a plan view thereof. FIG. 6C is a sectional view of FIG. 6B taken along the lines C.

FIG. 8 is a sectional view of FIG. 7.

FIG. 9A is a perspective view thereof. FIG. 9B is a plan view thereof. FIG. 9C is a sectional view of FIG. 9B taken along the lines D.

PREFERRED EMBODIMENTS OF THE INVENTION

Figure 1A:
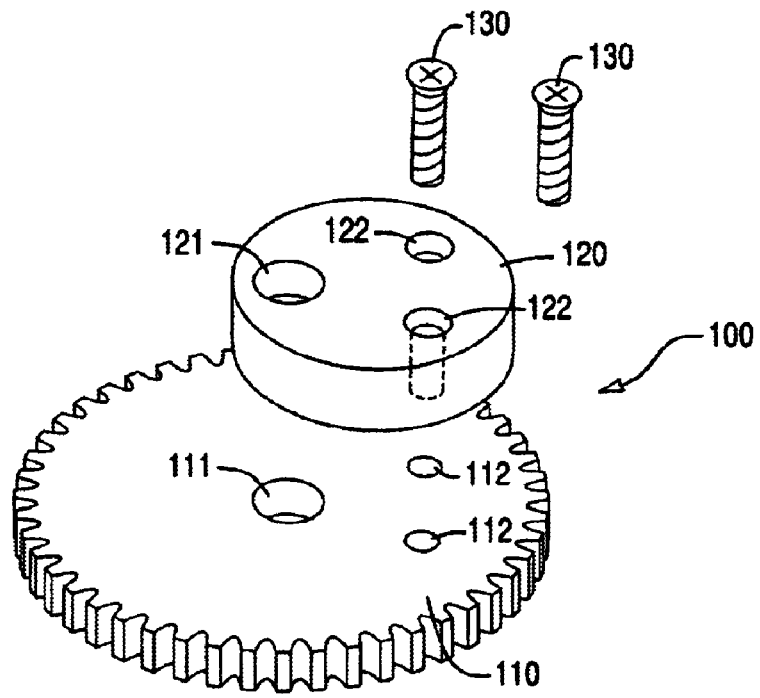
FIGS. 1A and 1B are perspective views showing a conventional cam mechanism for converting the circular motion to the reciprocating motion.
Figure 1B:
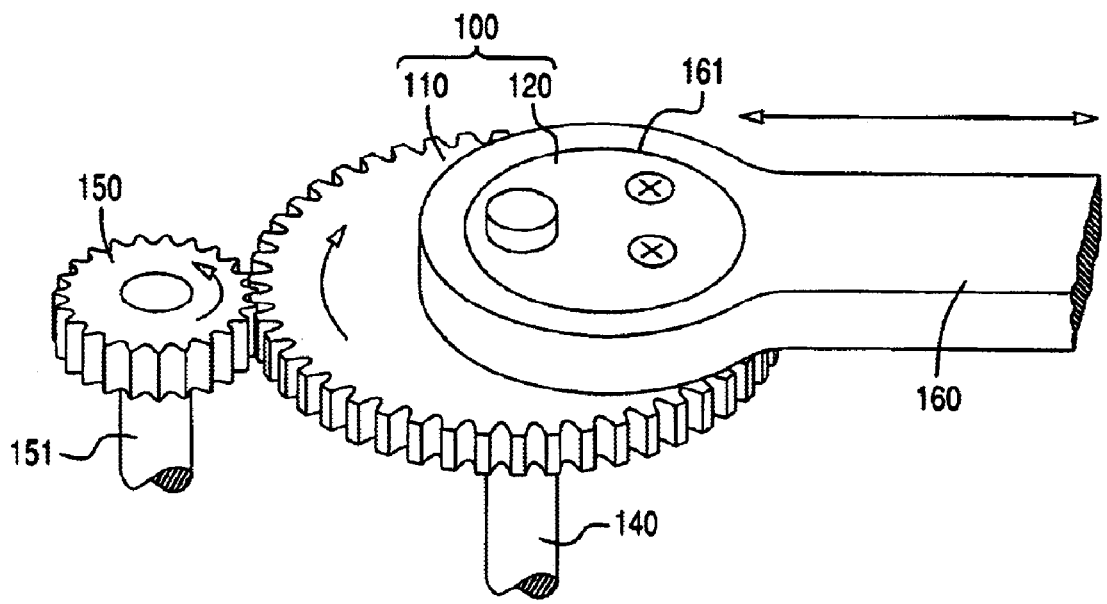

The preferred embodiments of the present invention will be described hereinafter with reference to the accompanying drawings. In the following description and the drawings, the same reference numerals are used for the same components and repetitive description on the same components will be omitted.

Figure 2A:
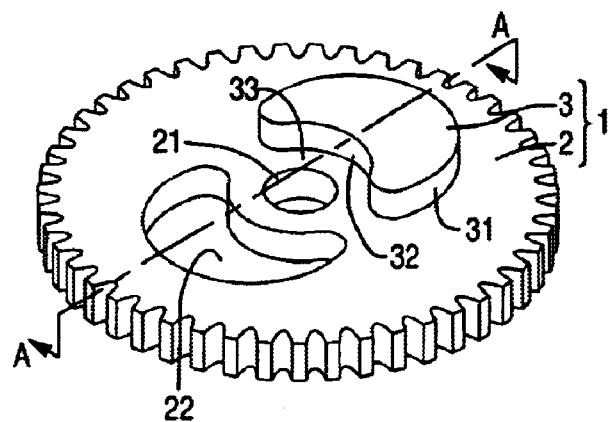
FIGS. 2A, 2B, 2C are views showing a cam mechanism according to the first embodiment of the present invention.
Figure 2B:
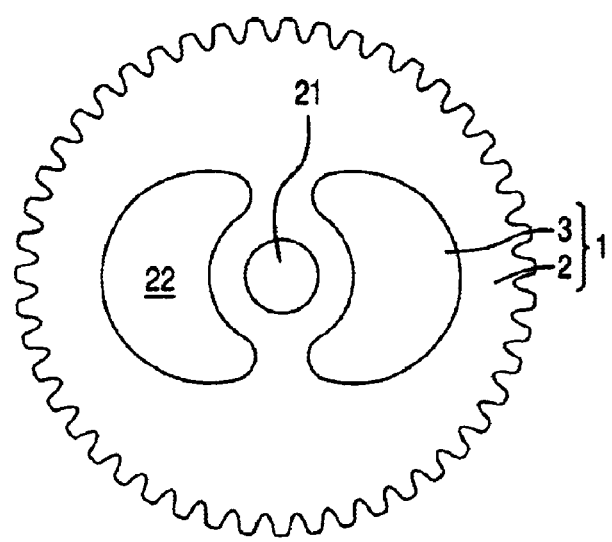
Figure 2C:
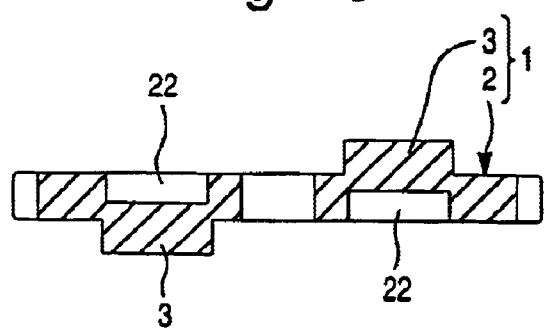

FIGS. 2A, 2B, 2C show a cam mechanism according to the first embodiment of the present invention. FIG. 2A is a perspective view of the cam mechanism, and FIG. 2B is a plan view thereof, and FIG. 2C is a sectional view thereof taken along the lines A. As shown in FIGS. 2A–2C, the cam mechanism 1 comprises a spur gear 2 having a plurality of gear tooth in the predetermined pitch, and a pair of eccentric cams 3 each protruded from the surface and the back of the spur gear 2. The spur gear 2 has a shaft hole 21 at the center. The inner surface of the shaft hole 21 is slidably fitted on a central shaft 5 which will be described later to rotatively support the spur gear 2 around the central shaft 5.

The eccentric cam 3 has an inscribed surface 31 inscribed in the circular locus having the center and diameter set to include the shaft hole 21, and a surface facing to the shaft hole 21 that is an opposing surface 32 opposing to the surface of the central shaft 5. The opposing surface 32 in the present embodiment is formed in the shape of the circular arc the center of which is the center of the shaft hole 21, which forms a concave notch 33 in order to avoid the interference of the eccentric cams. It should be noted that the shape of the concave notch 33 is not limited to the arc.

When the central shaft 5 is inserted in the shaft hole 21, the concave notch 33 can be utilized as a space for filling the lubricating oil such as grease between the outer surface of the central shaft 5 and the inscribed surface 31 of the eccentric cam 3.

In the present embodiment, the eccentric cams 3 are formed in the point symmetry with respect to the axis of the shaft hole 21 that is the phase difference of 180 degrees.

According to the present invention, the eccentric cam 3 is formed by the half blanking press processing. FIG. 3 is a sectional view to explain the half blanking press processing. The half blanking press processing is one of fine blanking. In the half blanking press processing, as shown in FIG. 3, a mold employed is a half blanking mold 9 having a negative clearance or zero clearance which means that no clearance exists between an outer surface of a punch 93 for half blanking and an inner surface of a blanking hole 92 of a lower mold 91. In the half blanking, a presser 95 having a projection for pressing a material to be processed (in the present embodiment, a raw iron plate 94 for the spur gear 2) and an inverse presser 96 for pressing the material from underneath are used. Accordingly, the raw iron plate 94 can tightly be held while it is processed to be pressed up to the half of the thickness.

Therefore, when the raw iron plate 94 is processed by the half blanking press processing using the half blanking mold 9, the raw iron plate 94 is pressed finely along the blanking hole 92 of the lower mold 91 since there is no escape in the area to be pressed of the raw iron plate 94. Thus formed eccentric cam 3 has an extremely smooth cut surface, no shear drop, no burr and the good dimensional accuracy. In the above-described way, a concave portion 22 which is caved in the back of the eccentric cam 3 due to the press of the punch 93 is formed at the spur gear 2.

FIGS. 4A, 4B, 4C, 4D show the process of manufacturing the cam mechanism by the half blanking press processing using the raw iron plate. FIG. 4A shows a piercing process; FIG. 4B, a process of half blanking of back; FIG. 4C, a process of half blanking of surface. FIG. 4D shows the raw iron plate with the spur gear removed after the half blanking. In FIGS. 4A–4D, the plan view is shown in the top and the cross sectional view is shown in the bottom. First, in the piercing process, as shown in FIG. 4A, a pair of pierced holes 94a for aligning are formed at the both sides of the belt-shaped raw iron plate 94 by the press machine which is not shown in figure.

Next, the raw iron plate 94 is moved to the right by the predetermined pitch by driving a predetermined driving machine. The raw iron plate 94 is aligned based on the pierced holes 94a by the known method. Thereafter, the half blanking press processing is performed on the back of raw iron plate 94 using a first half blanking mold (not shown) as shown in FIG. 4B. The first half blanking mold is a mold that the punch 93 and the inverse presser 96 shown in FIG. 2 are formed upside down. Then, under the process of the half blanking of the back, the eccentric cam 3 protruded from the surface which is pressed from the back is formed on the raw iron plate 94.

After the eccentric cam 3 is formed on the surface of the raw iron plate 94, the raw iron plate 94 is moved to the right by the same pitch as in the previous process by driving the driving machine. The raw iron plate 94 is aligned based on the pierced holes 94a. Thereafter, as shown in FIG. 4C, the half blanking press processing is performed on the surface of the raw iron plate 94 using a second half blanking mold which is not shown. The second half blanking mold is a mold that the punch 93 is provided at the top similar to the one shown in FIG. 3.

Further, the upper mold used separately from the punch 93 in the present process has a press blade corresponding to the tooth of the spur gear 2 and a press blade corresponding to the shaft hole 21 of the spur gear 2. After the punch 93 is used in the half blanking process, the punch 93 alternates with the upper mold to perform the normal press process. Accordingly, after the process of half blanking of the surface, as shown in FIG. 4C, the spur gear 2 having the pair of the eccentric cams 3 is pulled out from the raw iron plate 94 by the half blanking press processing process and the press process with the upper mold. Next, the raw iron plate 94 is moved by one pitch, and then the hole which is made after the spur gear 2 is removed is moved to the right as shown in FIG. 4D.

In the present embodiment, the raw iron plate 94 is moved by one pitch, and while the raw iron plate 94 is aligned based on the pierced holes 94a, it is processed consecutively in the piercing process, the process of half blanking of the back and the process of half blanking of the surface. Then, the spur gear 2 having the eccentric cams 3, that is, the cam mechanism 1 is manufactured.

Figure 5A:
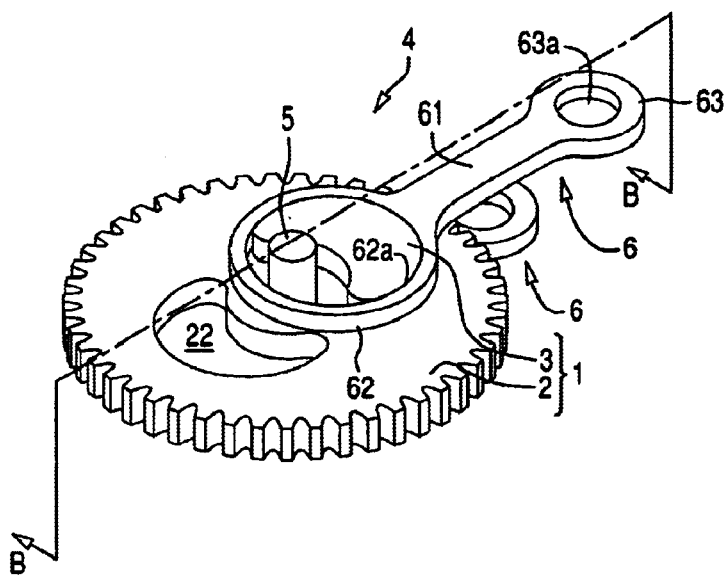
FIGS. 5A, 5B, 5C are views showing a cam apparatus according to the first embodiment of the present invention.
Figure 5B:
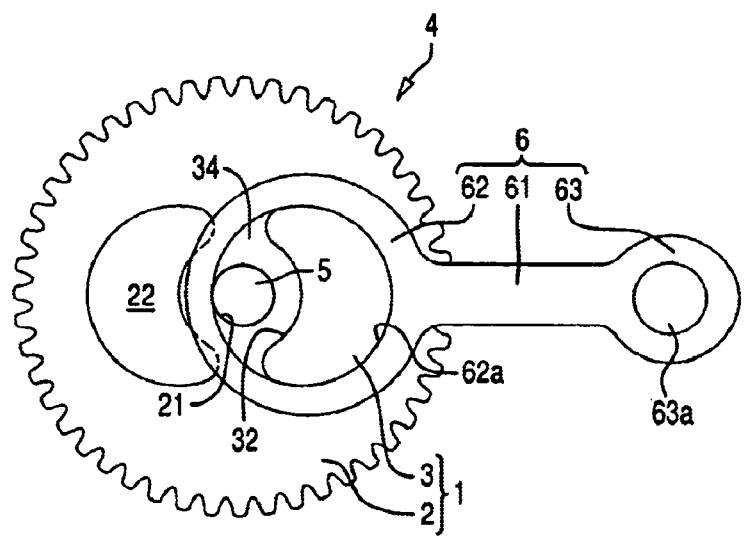
Figure 5C:
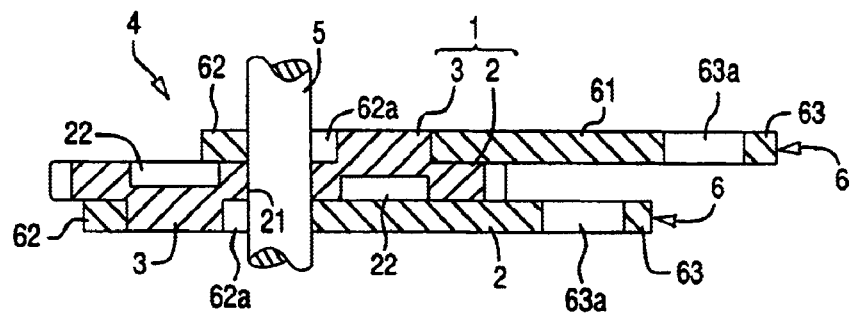

FIGS. 5A, 5B, 5C show a cam apparatus according to the first embodiment of the present invention. FIG. 5A is a perspective view of the cam apparatus. FIG. 5B is a plan view thereof. FIG. 5C is a cross sectional view thereof taken along the lines B. As shown in FIGS. 5A, 5B, 5C, the cam apparatus 4 is constituted by adding a central shaft 5 and an output rod 6 to the cam mechanism 1 of the first embodiment. The diameter of the central shaft 5 is set to be slidably inserted into the shaft hole 21 of the spur gear 2. Accordingly, the spur gear 2 rotates around the central shaft 5. The central shaft 5 is fixed to a predetermined apparatus (not shown) which utilizes the cam apparatus 4.

The output rod 6 comprises an elongated rod body 61, a circular body end connecting unit 62 provided at the body end of the rod body 61, and a circular distal end connecting unit 63 which is smaller than the body end connecting unit 62 and which is provided at the other end of the rod body 61. The body end connecting unit 62 has a body end circular hole 62a in which the eccentric cam 3 and the central shaft 5 are slidably fitted.

The distal end connecting unit 63 has a distal end circular hole 63a. The distal end circular hole 63a is to connect a predetermined member to perform the reciprocating motion. In the present embodiment, the pair of the output rods 6 are fitted to the eccentric cams 3 at the surface and back of the spur gear, respectively.

Further, in the eccentric cams 3 of the cam apparatus, the portions of the back and surface overlapped each other are formed as a concave notch 33. When the body end circular hole 62a is fitted on the eccentric cam 3, the concave notch 33 can be used as a space for filling the lubricating oil among the opposing surface 32 of the eccentric cam 3, the outer surface of the central shaft 5 and the inner surface of the body end circular hole 62a. The eccentric cam 3 and the body end connecting unit 62 relatively rotate smoothly by filling the lubricating oil such as grease in the filling space 34.

According to the cam apparatus 4, when the spur gear 2 engages with the predetermined driving gear, the spur gear 2 rotates around the central shaft 5 by driving the driving gear. Then, the output rod 6 reciprocates by the rotation of the spur gear 2, so that the predetermined member connected to the distal end connecting unit 63 reciprocates.

Figure 6A:
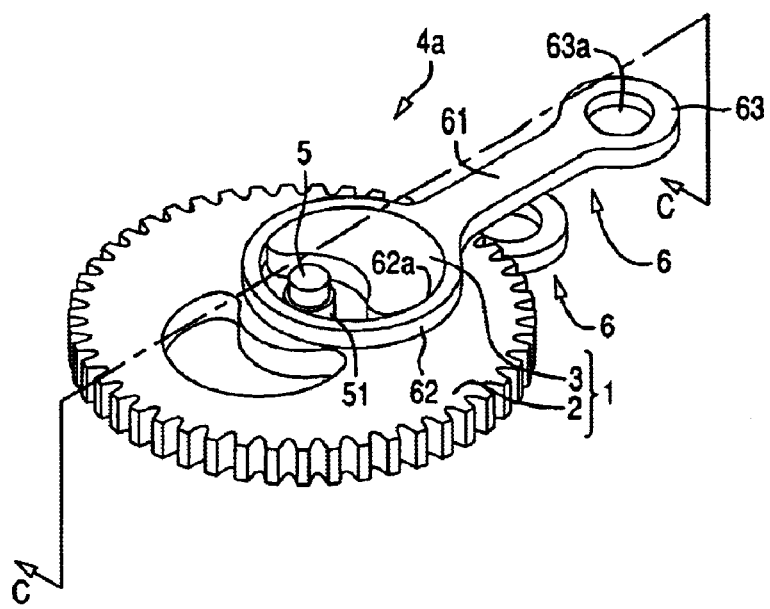
FIGS. 6A, 6B, 6C are views showing a cam apparatus according to the second embodiment of the present invention.
Figure 6B:
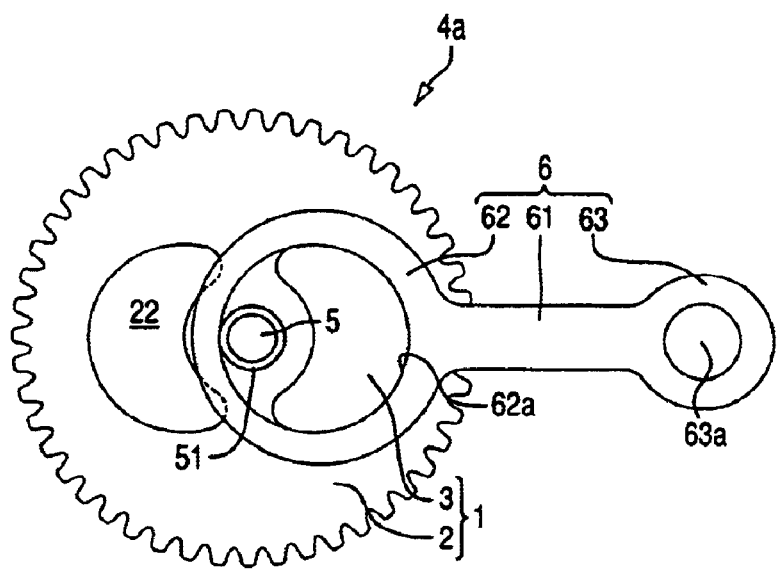
Figure 6C:
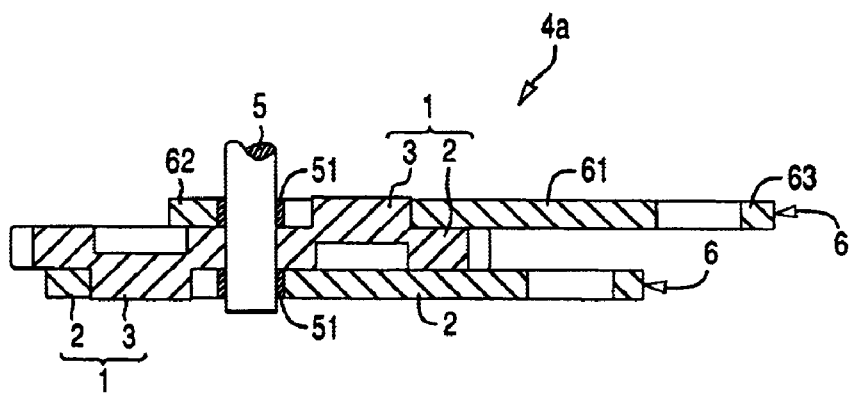

FIGS. 6A, 6B, 6C show a cam apparatus according to the second embodiment of the present invention. FIG. 6A is a perspective view of the cam apparatus. FIG. 6B is a plan view thereof. FIG. 6C is a cross sectional view thereof taken along the lines C. As shown in FIGS. 6A, 6B, 6C, in the cam apparatus 4a of the second embodiment, there is a sliding ring 51 is slidably fitted on the central shaft 5. The diameter of the central shaft 5 is set so that the inner surface of the body end circular hole 62a of the output rod 6 is slidable at the outer surface of the sliding ring 51. The other constitution of the cam mechanism 4a is the same as the cam mechanism 4 of the first embodiment.

According to the cam mechanism 4a of the second embodiment, when the eccentric cam 3 rotates around the central shaft 5 to perform the crank motion, since the sliding ring 51 rotates around the central shaft 5, the crank motion of the output rod 6 can smoothly be performed.

Figure 7:
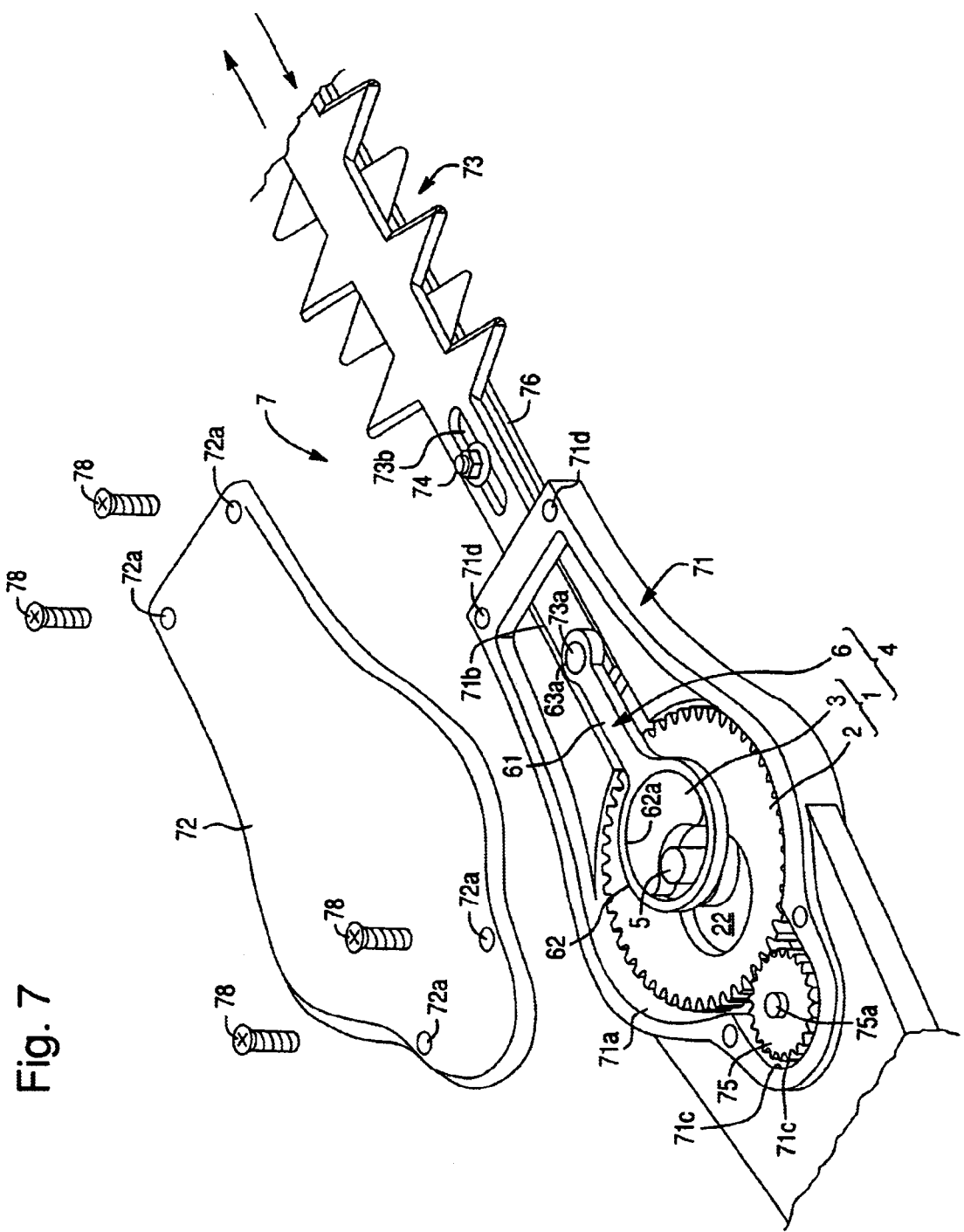
FIG. 7 is a perspective showing a main portion of a mowing machine utilizing the cam apparatus of the present invention according to one embodiment of the present invention.

FIG. 7 is a perspective view showing a main part of a mowing machine utilizing the above-described cam apparatus according to one embodiment of the present invention. FIG. 8 is a sectional view of FIG. 7. FIG. 7 shows the back of the mowing machine upward and FIG. 8 shows the back of the mowing machine downward. In the present embodiment, the cam apparatus 4 of the first embodiment is utilized. In FIGS. 7 and 8, the mowing machine 7 comprises a casing 71 containing the cam apparatus 4, a cover 72 placed at the bottom of the body for closing the opening of the casing 71, a pair of blades that are mowing blade members and that are connected to the cam apparatus 4 in the casing 71, and a driving mechanism which is not shown.

The casing 71 has the combined shape of circle and the square. At the circular portion, there is a cam mechanism storage 71a in which the cam mechanism 1 is installed. At the square portion next to the cam mechanism storage 71a (right of FIG. 7), there is a blade housing 71b for storing the ends of the pair of blades 73 so as to be movable back and force.

The cam mechanism storage 71a has the inner diameter slightly larger than the outer diameter of the spur gear 2. The central shaft 5 is provided upright at the bottom of the cam mechanism storage 71a. Further, the cam apparatus 4 is installed in the cam mechanism storage 71a so that the spur gear 2 is rotatively supported by the central shaft 5 by fitting the shaft hole 21 of the spur gear 2 on the central shaft 5.

The blade housing 71b has the width slightly larger than the width of the blade 73. Accordingly, the body ends of the pair of the blades 73 piled up to the other can be stored to slide back and force.

Each blade 73 has a connecting shaft 73a which is protruded in the direction opposite to the other protrusion when the blades 73 are piled up to the other. As shown in FIG. 8, the spur gear 2 is linked to each blade 73 through the output rod 6 by inserting each connecting shaft 73a to the circular hole 63a of the output rod 6 connected to the eccentric cam 3.

Each the blade 73 has a hole 73b elongated in the lengthwise direction at the center of width. Bolts 74 are inserted into the elongated holes 73b and fastened by nuts together with guide bars 76. Accordingly, it is ensured that the blades 73 are piled up outside the casing 71 and that the blades 73 slide in the elongated hole in the direction opposite to the other.

Further, there is a driving gear storage 71c for storing a driving gear 75 having a diameter smaller than the one of the spur gear 2 at the body end of the cam mechanism storage 71a (left of FIGS. 7, 8). A driving gear support shaft 75a is provided upright at the bottom of the driving gear storage 71c. The driving gear 75 is supported by the driving gear support shaft 75a so as to rotate around the driving gear support shaft 75a. The driving gear 75 has a pitch and a diameter so as to engage with the spur gear 2. Accordingly, the driving motion of the driving gear 75 is transmitted to the spur gear 2. The driving gear 75 rotates around the driving gear support shaft 75a when the driving gear support shaft 75a receives the driving force of the driving unit (not shown).

The cover 72 is formed as a bottom plate having the same plan shape as the casing 71. There are insertion holes 72a at four corners of the cover 72. Further, there are screw holes 71d at the casing 71 where the insertion holes 72a correspond to. When the cover 72 covers the opening of the casing 71 and fastens with the screws 78 through the insertion holes 72a and the screw holes 71d, the cover 72 is placed to the casing 71.

According to the constitution of the mowing machine 7, when the driving force of the driving unit is transmitted to the driving gear support shaft 75, the driving gear 75a also rotates. The rotation of the driving gear 75 is transmitted to the spur gear 2 which engages with the driving gear 75, so that the spur gear 2 rotates around the central shaft 5. Then, the eccentric cams 3 protruded from the surface and back of the spur gear 2 at the eccentric position in the phase difference of 180 degrees rotates around the central shaft 5 to perform the crank motion. Accordingly, the output rod 6 having the body end connecting unit 62 connected to the eccentric cam 3 performs the piston motion. Further, the piled blades 73 connected to the output rod 6 through the connecting shafts 73a reciprocate in the direction opposite to the other.

The eccentric cam 3 of the present invention is formed by the half blanking press processing, so that the manufacture of the cam 3 is easy as compared to the case that the eccentric cam is fixed to the spur gear 2 with the screws or caulking or the case of cutting. Therefore, it is very effective to lower the manufacturing cost of the mowing machine 7.

Figure 9A:
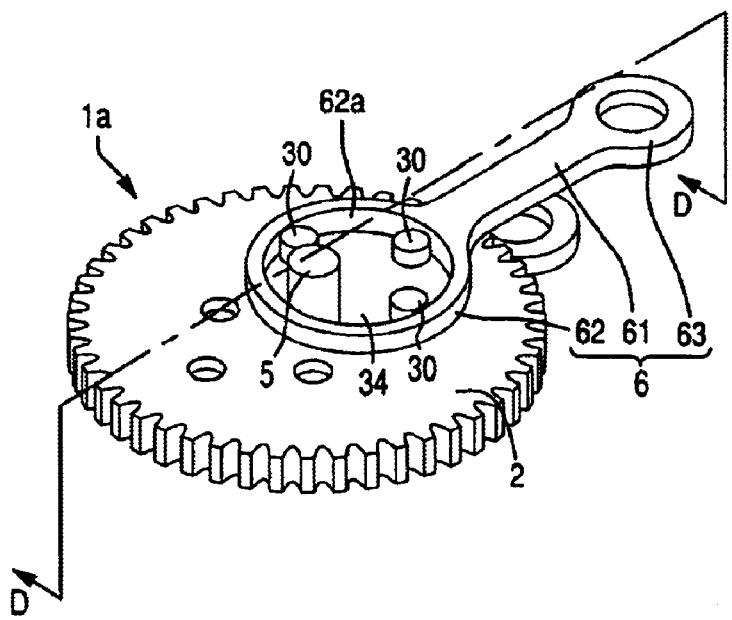
FIGS. 9A, 9B, 9C are views showing a cam mechanism according to the second embodiment of the present invention.
Figure 9B:
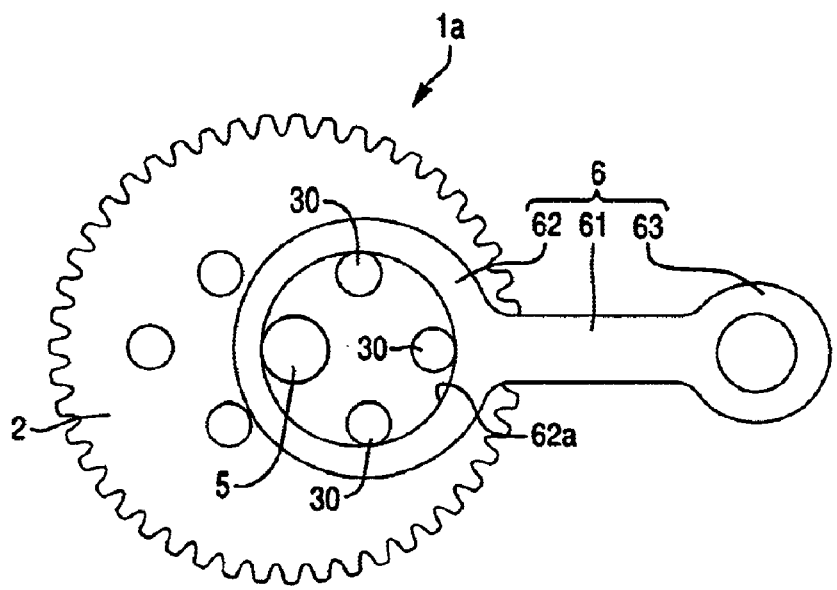
Figure 9C:
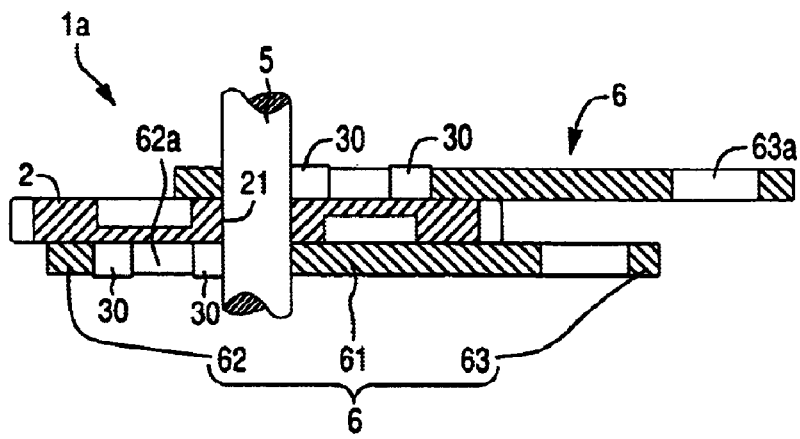

FIGS. 9A, 9B, 9C show a cam mechanism according to the second embodiment of the present invention. FIG. 9A is a perspective view of the cam mechanism. FIG. 9B is a plan view thereof. FIG. 9C is a cross sectional view thereof taken along the lines D. As shown in FIGS. 5A, 5B, 5C, in the cam mechanism 1a of the second embodiment, three cylindrical cam protrusions 30 are used as the cam instead of the crescent-shaped eccentric cams 3. The cam protrusions 30 are provided in the position so as to be in contact with the inner surface of the body end circular hole 62a of the output rod 6. The other constitution of the cam mechanism 1a is the same as the constitution of the cam mechanism 1 of the first embodiment.

According to the cam mechanism 1a of the second embodiment, the total cross section of the three cam protrusions 30 is smaller than the one of the eccentric cam 3, so that the press pressure in the half blanking press processing can be made smaller, which lowers the energy cost.

As described above, the cam mechanism 1, 1a comprises the metal spur gear 2, and the eccentric cam 3 (or cam protrusion 30) protruded from at least one of the surface and back of the spur gear 2. The eccentric cam is formed by the half blanking press processing (fine blanking), so that the eccentric cam has an extremely smooth cut surface, no shear drop, no burr and the good dimensional accuracy. Therefore, the eccentric cam unctions sufficiently when the circumferential surface slides to the inner surface of the body end circular hole 62a of the output rod 6.

Since the eccentric cam 3 is formed by the above-described method, he material cost and the processing cost are made lower as compared to the case that the eccentric cam is fixed to the gear with the screws or caulking, which mean that the manufacturing cost is lowered.

Further, the shaft hole 21 is formed at the center of the spur gear 2, and, like the eccentric cam 3 of the first embodiment that comprises the inscribed surface 31 which is inscribed in the circular locus having the center and diameter so as to include the shaft hole 21, and the concave notch 33, the cam protrusions 30 defines a shape and area, which in the first embodiment is formed by separating the facing surface which is at the opposite side of the inscribed surface 31 from the shaft hole 21 by the predetermined distance. Then, while the body end circular hole 62a of the output rod 6 is fitted on the eccentric cam projections 30, the central shaft 5 inserted in the shaft hole 21 of the spur gear is placed inside the body end circular hole 62a. Accordingly, the lubricant can be filled in the space 34, so that the eccentric cam projections 30 can operate smoothly, and the frequency of refilling the lubricant can be made smaller.

Furthermore, when the eccentric cams 3 are formed on both surfaces of the spur gear 2, the circular motion can be converted in the reciprocating motion at both surfaces of the spur gear 2. Since the eccentric cams 3 are formed in point symmetry with respect to the axis of the shaft hole 21, a pair of other members can reciprocate in the phase difference of 180 degrees.

Further, the cam apparatus 4, 4a or the cam apparatus utilizing the cam mechanism 1, 1a comprises the output rod having the body end circular hole 62a at one end to be fitted on the eccentric cam 3, so that the rotation of the spur gear 2 can be converted into the reciprocating motion through the eccentric cam 3 and the output rod.

Further, the mowing machine 7 comprises a cam apparatus 4 or 4a and a cam mechanism 1 or 1a, so that the manufacturing cost of the mowing machine 7 can be lowered.

The present invention is not limited to the above-described embodiments but it can be versatile. Some of examples will be explained below.

In the first embodiment, the eccentric cam 3 and the central shaft 5 are positioned so that the outer surface of the central shaft 5 is in contact with the circular locus to which the inscribed surface 31 of the eccentric cam 3 is inscribed but the outer surface of the central shaft 5 does not have to be in contact with the circular locus unless the central shaft 5 is placed inside the circular locus.

In the above-described embodiments, the spur gear 2 is rotatively supported by the central shaft 5. Instead of using the central shaft 5, for example, the outer surface of the spur gear 2 can be to be slidable to the inner surface of the casing 71. Accordingly, the interference between the eccentric cam 3 and the central shaft 5 does not exist despite of the position of the eccentric cam 3. Then, the concave notch 33 for preventing the interference does not have to be provided and the eccentric cam 3 can be formed circular, which lowers the manufacturing cost.

In the present embodiments, the eccentric cams 3 are formed in the point symmetry (phase difference of 180 degrees) at the top and back of the spur gear 2 but the phase difference can freely be chosen.

In the present embodiments, the eccentric cams 3 are formed at the top and back of the spur gear 2 but the eccentric cam 3 can be formed at only one surface.

What is claimed is:

1. A cam mechanism comprising:

a metal gear, having a centrally located shaft hole, said metal gear being fit onto a shaft and continuously rotatable thereabout and about a rotational axis; and a pair of eccentric cams integrally formed with said metal gear, said pair of eccentric cams being formed by performing half blanking press processing, wherein said pair of integrally formed eccentric cams comprises a first eccentric cam protecting from a top surface and a second eccentric cam projecting from a bottom surface of said metal gear, each of said first and second cams being completely circumscribed by cam surfaces, and wherein said first and second eccentric cams are disposed on opposite sides of a plane passing through said shaft hole parallel to said rotational axis without intersecting said plane.

2. A cam mechanism according to claim 1, wherein said cam surface of said first and second eccentric cams are formed with an outward external peripheral surface symmetrically and radially disposed on opposite sides of said shaft hole.

3. A cam mechanism according to claim 1, wherein said cam surfaces of said first and said second eccentric cams comprises a concave notch with an inscribed surface having a circular locus with a geometric center to include said shaft hole.

4. A cam mechanism according to claim 2, wherein said shaft has a diameter smaller than that of said shaft hole, wherein a sliding ring is fitted on said shaft, and said sliding ring has an outer diameter so as to slide on an inner surface of said shaft hole.

5. A cam mechanism according to claim 2, wherein said first and second eccentric cams are formed by a plurality of eccentric cam protrusions inscribed in a circular locus having a center and a diameter so as to include said shaft hole.

* * * * *